United States Patent [19]

Medney

[11] 4,269,436
[45] May 26, 1981

[54] PRE-INSULATED PIPE SYSTEM

[76] Inventor: Jonas Medney, 3504 Woodward St., Oceanside, N.Y. 11572

[21] Appl. No.: 139,802

[22] Filed: Apr. 14, 1980

[51] Int. Cl.³ .............................................. F16L 11/12
[52] U.S. Cl. ..................................... 285/47; 285/179; 285/276; 285/305; 285/331
[58] Field of Search .................. 285/305, 276, 47, 54, 285/331, 138, 134, 179

[56] References Cited

U.S. PATENT DOCUMENTS

| | | | |
|---|---|---|---|
| 3,492,029 | 1/1970 | French et al. ..................... | 285/138 X |
| 3,606,402 | 9/1971 | Medney .............................. | 285/305 |
| 3,606,403 | 9/1971 | Medney .............................. | 285/423 X |
| 3,645,564 | 2/1972 | Corriston ............................ | 285/47 |
| 3,860,742 | 1/1975 | Medney .............................. | 285/305 X |
| 3,913,954 | 10/1975 | Klimpl ................................ | 285/305 |
| 4,032,708 | 6/1977 | Medney .............................. | 174/36 |

FOREIGN PATENT DOCUMENTS

| | | | |
|---|---|---|---|
| 1182483 | 11/1964 | Fed. Rep. of Germany ........... | 285/305 |
| 651220 | 1/1963 | Italy ....................................... | 285/305 |
| 291644 | 6/1928 | United Kingdom ..................... | 285/47 |

*Primary Examiner*—Dave W. Arola
*Attorney, Agent, or Firm*—Posnack, Roberts, Cohen & Spiecens

[57] ABSTRACT

A joint for connecting first and second pipes, each including spaced inner and outer pipe members and a foam material filling the space between the inner and outer pipe members. The inner pipe members of the two pipes are adapted for conveying a fluid medium, the inner pipe member of the first pipe having a flared female end and the inner pipe member of the second pipe having a male end sealably inserted in the female end. The foam material in the second pipe is provided with a recess in which the first pipe extends so that the foam material in said first pipe confronts the foam material in the second pipe. The outer pipe member of the first pipe has an annular groove therein which faces outwardly and a coupling in the form of a separate tubular member secured to the second pipe or a thickened portion integral with the second pipe surrounds the outer pipe member of the first pipe and has an annular groove therein which faces inwardly and is in registry with the annular groove in the outer pipe member. A flexible key member is inserted in part in each of the grooves to lock the coupling and the first pipe in axially secured relation while permitting relative rotation therebetween. At an elbow of one of the pipes a reinforcement is provided in the form of annular rings surrounding the inner pipe member and embedded in the foam material.

16 Claims, 4 Drawing Figures

PRE-INSULATED PIPE SYSTEM

FIELD OF THE INVENTION

The invention relates to a pre-insulated pipe system and particularly to a pipe containing a rigid insulated foam material. The invention is particularly directed to connection joints for said pipes and to reinforcement means at elbows of said pipes.

BACKGROUND

Pre-insulated pipes are known in which an insulation material is interposed between inner and outer pipe members. However, the formation of joints connecting two pipes has proven to be difficult and involves the need for producing a foam material in the field.

Although numerous pipe joints are knwon in the art, as for example in my earlier U.S. Pat. Nos. 3,606,402; 3,606,403; 3,860,742; 4,032,708; as well as in other patents such as U.S. Pat. No. 3,913,954, these patents are only concerned with pipes of singular tube construction.

SUMMARY OF THE INVENTION

An object of the invention is to provide a pre-insulated pipe construction including inner and outer pipe members with a foam material filling the space between the inner and outer pipe members, said pipe construction being adapted for the formation of a pipe joint without the need for producing a foam in the field.

A further object of the invention is to provide such a construction in which the pipe joint can be rapidly formed without the need for special tools or skilled personnel.

Yet another object of the invention is to provide a pipe construction of the above type which is specially reinforced at an elbow to permit assembly of the joint without requiring external reinforcement in the field. Hence, a pipe-line can be formed in the field with joints and elbows without the need for special tools or the production of foam.

In accordance with the invention, a pre-insulated pipe is provided which includes a pipe joint comprising first and second pipes, each pipe including spaced inner and outer pipe members and a foam material filling the space between the inner and outer pipe members. The inner pipe members of the two pipes are adapted for conveying a fluid medium. The inner pipe members of the first pipe has a flared female end, the inner pipe member of the second pipe having a male end inserted in the female end. The foam material in said second pipe is provided with a recess into which said first pipe extends so that the foam material in said first pipe confronts the foam material in said second pipe. The outer pipe member of the first pipe has an annular groove therein which faces outwardly. Coupling means surrounds said outer pipe member of said first pipe and is provided with an annular groove therein which faces inwardly and is in registry with said annular groove in said outer pipe member. Key means extends in part in each of said grooves for locking said coupling means and said first pipe in axially secured relation while permitting relative rotation therebetween. Means secures said coupling means to the outer pipe member of said second pipe such that said second pipe is axially secured to said first pipe.

In further accordance with the invention, the pipe joint further comprises seal means supported by one of said inner pipe member said first and second pipes for forming a sealed relation between said inner pipe members when said male end of the inner pipe member of said second pipe is inserted into the female end of the inner pipe member of said first pipe.

In accordance with one embodiment of the invention, said means which secures the coupling means to the outer pipe member of the second pipe comprises an integral connection between said coupling means and said outer pipe member. In this embodiment, said first and second pipes are identical, each having a male end at one end and a female end at the other end.

In a further embodiment of the invention, a union joint is formed in which said coupling means comprises a tubular coupling member surrounding said first and second pipes, said coupling member and said outer pipe member of said second pipe having respective second annular grooves in registry with one another, and second key means extending in part in each of said second annular grooves.

In further accordance with the invention, reinforcement means is provided between the inner and outer pipe members at an elbow of one of the pipes.

In a particular embodiment in which the elbow forms an angle of 90°, the reinforcement means comprises an annular ring disposed in a plane passing through the vertex of the angle and second and third rings at right angles to one another in proximity to the first ring.

BRIEF DESCRIPTION OF THE SEVERAL FIGURES OF THE DRAWING

DETAILED DESCRIPTION

Figure 1:
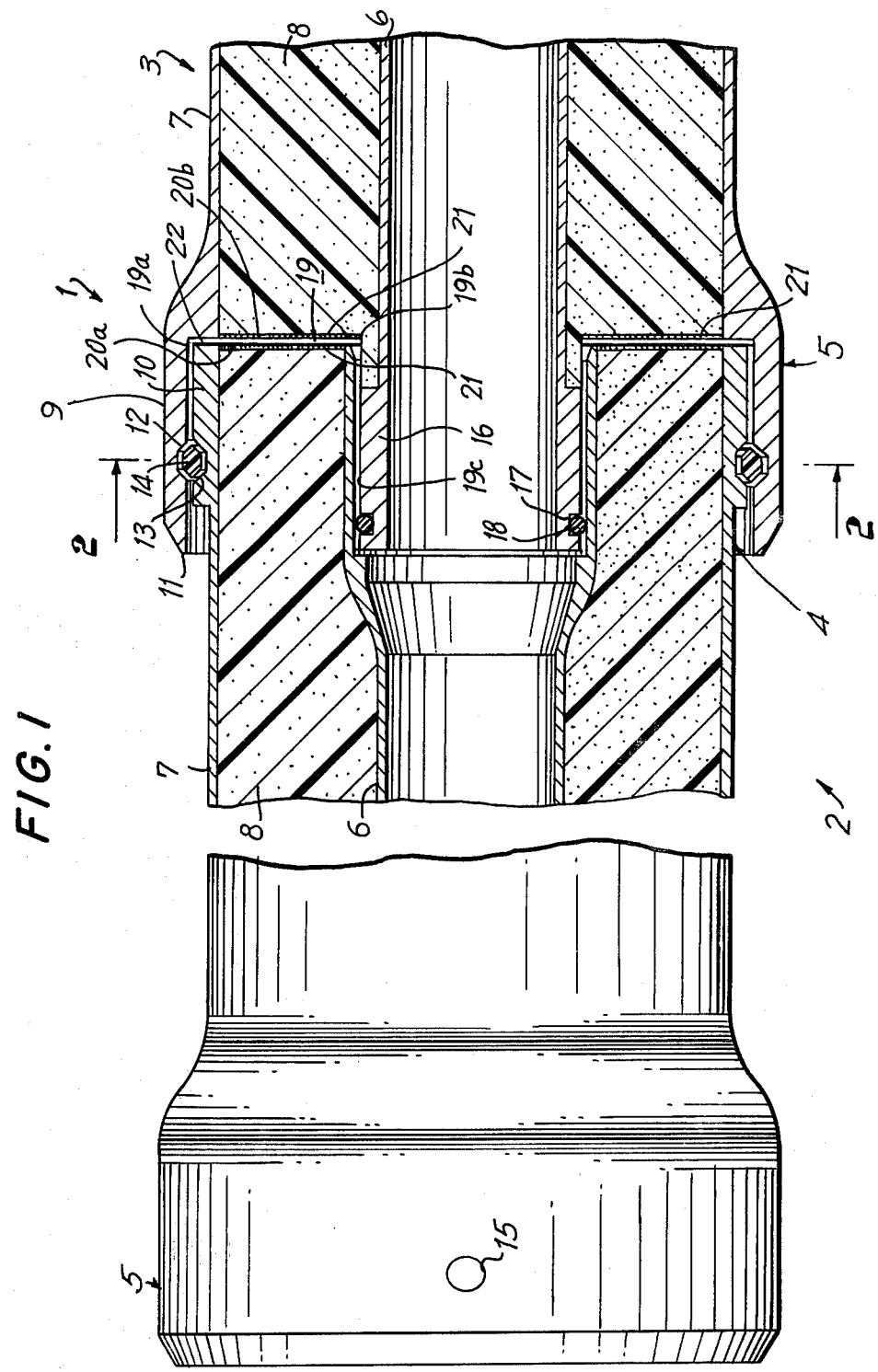
FIG. 1 is an elevational view of a pipe system broken in length and showing a longitudinal sectional view through a first embodiment of a pipe joint.
Figure 2:
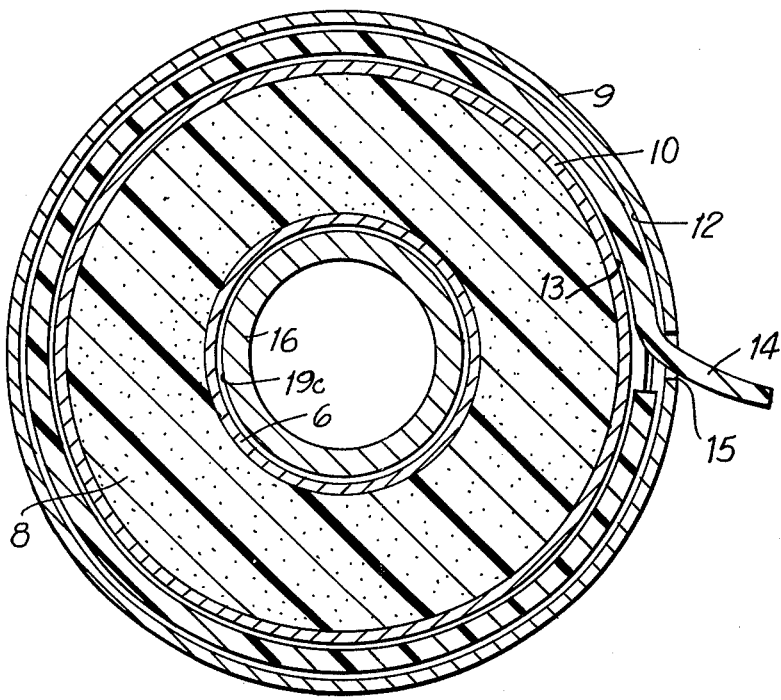
FIG. 2 is a sectional view taken along line 2—2 in FIG. 1.

In FIGS. 1 and 2, there is seen a pipe system comprising a joint 1 connecting pipes 2 and 3. The pipes 2 and 3 are identical, each having a male end 4 and a female end 5. The male end 4 of pipe 2 is inserted into the female end 5 of the pipe 3.

Each pipe is a pre-insulated pipe and includes spaced inner and outer pipe members 6 and 7 respectively with a foam material 8 filling the space between the pipe members.

The inner pipe member 6 serves as a carrier pipe for a fluid and is capable of resisting radial or hoop stresses imparted by pressure of the fluid. The foam material is a rigid polyurethane foam body which serves as an insulation means for the fluid flowing in the inner pipe.

The outer pipe surrounding the foam body serves to cover the same and it also serves as a means for taking-up the longitudinal forces at the joint.

In the embodiment of FIGS. 1 and 2, the female end 5 of pipe 3 is formed with a thickened coupling portion 9 which is integral with the remainder of pipe 3. The male end 4 of pipe 2 includes a thickened portion 10 which is fitted within portion 9. The end 11 of thickened portion 8 extends beyond the thickened portion 9 to cover and protect the same.

The thickened portion 9 is provided with an annular groove 12 and the thickened portion 10 is provided with an annular groove 13. The annular grooves 12 and 13 are in registry when the male end 4 is fully inserted in the female end 5 and the grooves 12 and 13 cooperatively define a hexagonal cross-section.

In order to lock the joint axially, i.e. to resist longitudinal forces, a key means in the form of a flexible cable 14 is inserted into the grooves 12 and 13 through a circumferentially elongated slot 15 in the female end 5. Because the cable 14 is flexible, it can be easily thrust along the grooves over the entire circumferential extent thereof as shown in FIG. 2. The cable 14 has a hexagonal cross-section corresponding to the cross-section of the grooves 12 and 13. This construction minimizes cracking of the portion 9 during loading as explained in U.S. Pat. No. 3,606,402.

The inner pipe member 6 has a thickened end portion 16 at the female end 5. The portion 16 is provided with an annular groove 17 in which an O-ring 18 is received. Upon insertion of male end 4 into female end 5, the O-ring 18 forms a seal between the inner pipe members thereby sealing the flow of fluid in the inner pipe members.

As evident from FIG. 1, an annular recess 19 is formed in the female end into which the male end is fitted. The recess 19 is formed by inner surface 19a in portion 9, a notch 19b in foam body 8 in female end 5 and outer surface 19c of portion 16.

In operation, the male end 4 is inserted into recess 19 during which time a sealed relation is formed between the inner pipe members by ring 18. The flexible key is then mounted into the grooves 12 and 13 to lock the joint axially. The foam bodies 8 of the male and female ends have respective confronting surfaces 20a and 20b and these are protected by a vapor barrier consisting of an epoxy coating 21 applied to each of the confronting surfaces prior to insertion of the male end into the female end. By virtue of the step form of the recess 19 labryinth passage is established from the seal ring 18 to the exterior to minimize leakage to the outside or penetration of water or other fluid into the inner pipe members.

The free end 22 of the male end 4 extends beyond the thickened portion 16 of female end 5 to provide overlap between the foam bodies of the two pipes and the formation of an L-shape passage at the gap between the ends of the male and female pipes to minimize heat loss.

Figure 3:
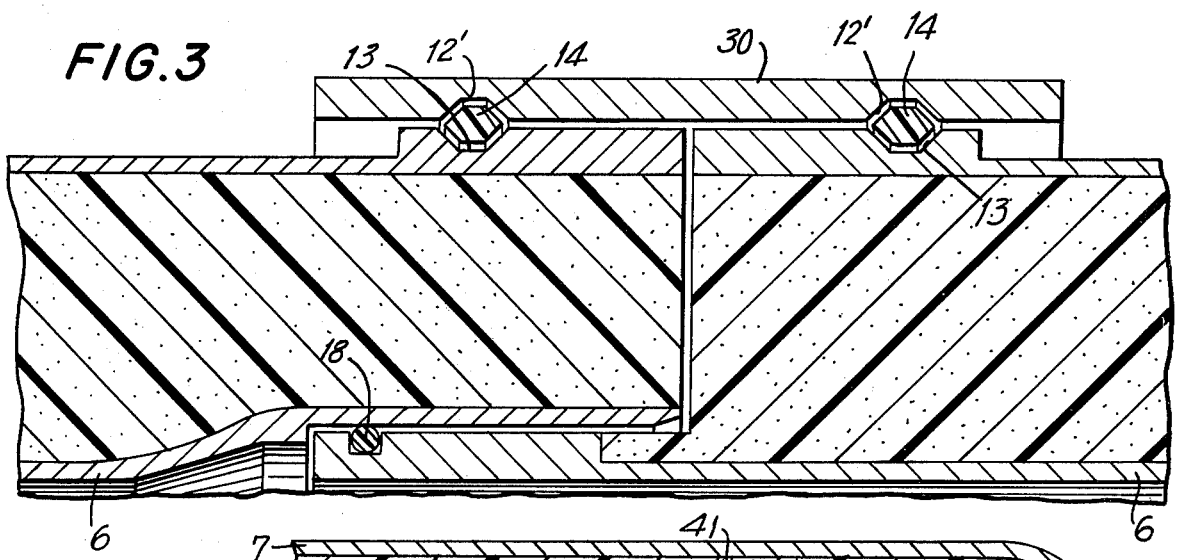
FIG. 3 is a longitudinal sectional view through a second embodiment of the pipe joint.

FIG. 3 shows a modification in which the joint formed between the two pipes is constructed as a union joint. Similar reference numerals will be used with reference to FIG. 3 for the same or similar elements as shown in FIGS. 1 and 2.

Instead of employing the thickened portion 9 at the female end 5 as in FIGS. 1 and 2, a separate coupling member 30 is employed. The coupling member surrounds the confronting ends of the pipes of the joint and is axially locked to the respective pipes by means of separate key members 14.

In use, one pipe is inserted into the coupling member until the annular groove 13 of the pipe is aligned with the groove 12' in the coupling member. The other pipe is then inserted into the coupling member until its groove 13 is aligned with the other groove 12' in the coupling member. The key members 14 are then introduced into the respective aligned grooves to axially lock the pipes to one another through the coupling member 30. The inner pipe members are constructed as in the embodiment of FIGS. 1 and 2 so that when the inner pipe members are interengaged the seal member 18 will form a seal between the inner pipe members 6.

Figure 4:
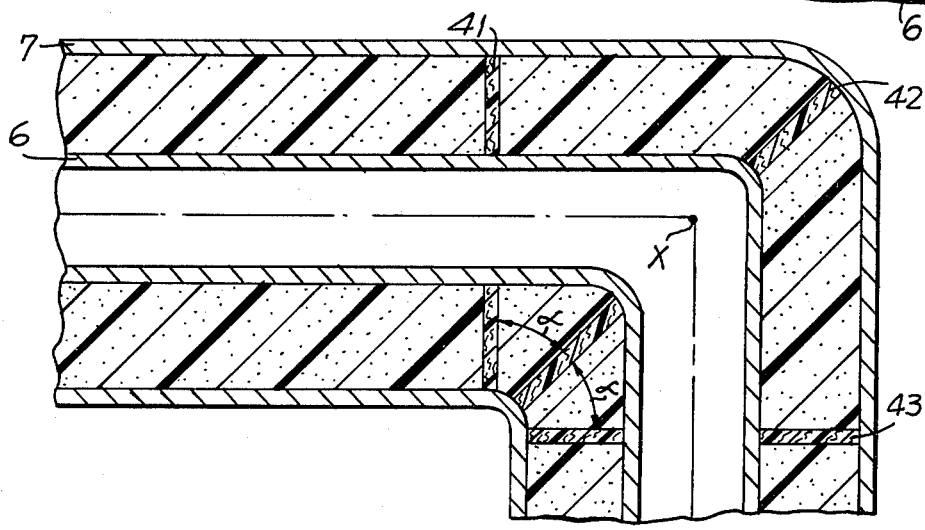
FIG. 4 is a sectional view of a 90° elbow of one of the pipes.

In order for the construction of the pre-insulated pipes to be effective in forming a pipeline, it is frequently necessary to provide an elbow joint as shown in FIG. 4. In this figure, the elbow joint is at right angles i.e. is a 90° elbow and the fluid which flows in the inner pipe member 6 applies compressive forces to the foam body 8 as it changes direction at the elbow.

In order to provide a reinforcement means which will resist the forces applied by the change of direction of flow of the fluid, the invention contemplates the provision of a plurality of annular rings 41,42 and 32. The rings are preferably made of fiberglass. The annular rings extend in the space between the inner and outer pipe members 6 and 7 and they are embedded within the foam bodies 8. The annular rings 41 and 43 are at right angles to one another and the annular ring 42 forms an angle bisector between the rings 41 and 43. Hence, in the 90° elbow, as shown in FIG. 4, each angle $\alpha$ between ring 42 and the respective rings 41 and 43 is equal to 45° and the ring 42 intersects the point X at which the center line of the pipe undergoes 90° change at the elbow.

The elbow can be integrally formed with one of the pipes or it can be formed as a separate element which is joined to two pipes in the manner as shown in FIGS. 1 or 3. Hence, in the case of connection as shown in FIG. 1, one end of the elbow will be formed as a male end and the opposite end of the elbow will be formed as a female end. In the case of the connection as shown in FIG. 3, the ends of the elbow will be formed as shown by the respectively engaged ends in FIG. 3 and connection will be made between the pipes and the ends of the elbows by couplings 30 and key members 14.

The elbow joint can also be formed by joining two mitered pipes at right angles to one another, for example, by welding them along their outer pipe members.

Although the invention has been described in conjunction with specific embodiments, it will become apparent to those skilled in the art that numerous modifications and variations can be made within the scope and spirit of the invention as defined in the attached claims.

What is claimed is:

1. A piping system comprising first and second pipes, each pipe including spaced inner and outer pipe members and a foam material filling the space between the inner and outer pipe members, the inner pipe members of the two pipes being adapted for conveying a fluid medium, the inner pipe member of the first pipe having a flared female end, the inner pipe member of the second pipe having a male end inserted in the female end, said foam material in said second pipe being provided with a recess in which said first pipe extends so that the foam material in said first pipe confronts the foam material in said second pipe, the outer pipe member of the first pipe having an annular groove therein which faces outwardly, coupling means surrounding said outer pipe member of said first pipe and having an annular groove therein which faces inwardly and is in registry with said annular groove in said outer pipe member, key means extending in part in each of said grooves for locking said coupling means and said first pipe in axially secured relation while permitting relative rotation therebetween, and means securing said coupling means to the outer pipe member of said second pipe such that said second pipe is axially secured to said first pipe.

2. A piping system as claimed in claim 1 comprising seal means supported by one of said inner pipe members of said first and second pipes for forming a sealed relation between said inner pipe members when said male end of the inner pipe member of said second pipe is inserted into the female end of the inner pipe member of said first pipe.

3. A piping system as claimed in claim 2 wherein said male end comprises a thickened portion with a groove receiving said seal means.

4. A piping system as claimed in claim 3 wherein said female end of said inner pipe member of said first pipe covers said male end and extends axially beyond said thickened portion.

5. A piping system as claimed in claim 1 wherein said outer pipe member has an end with a thickened portion in which said groove is formed.

6. A piping system as claimed in claim 5 wherein said coupling means covers said thickened portion of said end of the outer pipe member and extends axially therebeyond.

7. A piping system as claimed in claim 1 wherein said key means conprises a flexible cable, said coupling means being provided with a slot aligned with said groove therein, said key means comprising a flexible cable inserted into said grooves via said slot, said cable having a hexagonal cross-section.

8. A piping system as claimed in claim 1 wherein said means which secures the coupling means to the outer pipe member of the second pipe comprises an integral connection between said coupling means and said outer pipe member.

9. A piping system as claimed in claim 8 wherein said first and second pipes are identical, each having a male end at one end and a female end at the other end.

10. A piping system as claimed in claim 1 wherein said coupling means comprises a tubular coupling member surrounding said first and second pipes, said coupling member and said outer pipe member of said second pipe having respective second annular grooves in registry with one another, and second key means extending in part in each of said second annular grooves.

11. A piping system as claimed in claim 1 comprising vapor barrier means on the confronting faces of said foam material in said first and second pipes.

12. A piping system as claimed in claim 1 comprising an elbow joint forming an angle in the piping system, said elbow joint including inner and outer pipe members, foam material between said pipe members and reinforcement means at said elbow joint for resisting forces applied to the inner pipe member due to change of direction of flow of fluid in said inner pipe member at said elbow, said reinforcement means being disposed between said inner and outer pipe members and embedded in said foam material.

13. A piping system as claimed in claim 12 wherein said reinforcement means comprises a plurality of annular rings.

14. A piping system as claimed in claim 13 wherein one of said annular rings is disposed in a plane passing substantially through the vertex of said angle at said elbow, and second and third rings are disposed on respective opposite sides of said one ring.

15. A piping system as claimed in claim 14 wherein said angle is 90°, said second and third rings being perpendicular to one another, said one ring bisecting the angle between said second and third rings.

16. A piping system as claimed in claim 15 wherein said rings are made of fiberglass.

* * * * *